United States Patent [19]
Smith

[11] Patent Number: 5,643,421
[45] Date of Patent: Jul. 1, 1997

[54] DEHYDRATION OF GASES WITH LIQUID DESICCANTS

[75] Inventor: Robert Sherwood Smith, Houston, Tex.

[73] Assignee: OPC Engineering, Inc., Houston, Tex.

[21] Appl. No.: 409,867

[22] Filed: Mar. 24, 1995

[51] Int. Cl.⁶ ........................... B01D 3/00
[52] U.S. Cl. .................. 203/12; 203/99; 202/158; 95/192; 95/193; 95/208; 95/209; 95/237
[58] Field of Search ............... 203/12, 99; 95/192, 95/193, 208, 209, 237; 202/158

[56] References Cited

U.S. PATENT DOCUMENTS

| | | | |
|---|---|---|---|
| 2,690,814 | 10/1954 | Reid | 183/114.6 |
| 3,105,748 | 10/1963 | Stahl | 55/174 |
| 3,321,890 | 5/1967 | Barnhart | 55/32 |
| 3,348,601 | 10/1967 | Hill | 159/13 |
| 3,349,544 | 10/1967 | Arnold et al. | 55/32 |
| 3,471,370 | 10/1969 | Jubin, Jr. | 203/49 |
| 3,609,942 | 10/1971 | Alleman | 55/31 |
| 3,736,725 | 6/1973 | Alleman et al. | 55/32 |
| 3,975,229 | 8/1976 | Jackson | 159/31 |
| 4,005,997 | 2/1977 | Fowler et al. | 55/32 |
| 4,070,231 | 1/1978 | Alleman | 159/47 |
| 4,115,084 | 9/1978 | Coggins | 55/176 |
| 4,162,145 | 7/1979 | Alleman | 55/32 |
| 4,432,779 | 2/1984 | Honerkamp et al. | 55/253 |
| 4,434,034 | 2/1984 | Padilla | 202/153 |
| 4,455,157 | 6/1984 | Honerkamp et al. | 55/234 |
| 4,529,413 | 7/1985 | Ferguson | 55/32 |
| 4,636,284 | 1/1987 | English et al. | 203/18 |
| 4,661,130 | 4/1987 | Ebeling et al. | 55/234 |
| 4,701,188 | 10/1987 | Mims | 55/20 |
| 4,753,664 | 6/1988 | Honerkamp et al. | 55/174 |
| 4,919,257 | 4/1990 | Brigham, Sr. et al. | 202/155 |

*Primary Examiner*—Nina Bhat
*Attorney, Agent, or Firm*—Arnold, White & Durkee

[57] ABSTRACT

A gas drying method is disclosed in which gas streams are dehydrated to low dew points by contacting the wet gas with a dry liquid desiccant, with the liquid desiccant regenerated by heating it and stripping it with a stripping agent that is dried with solid desiccant.

8 Claims, 1 Drawing Sheet

DEHYDRATION OF GASES WITH LIQUID DESICCANTS

FIELD OF THE INVENTION

This invention relates to the separation and removal of water from a gas-water mixture using a liquid desiccant, as well as the removal of water from the liquid desiccant such that the liquid desiccant can be reused.

DESCRIPTION OF THE RELATED ART

Natural gas, refinery gas, carbon dioxide, hydrogen, synthesis gas, gas from an oil production facility and other industrial gases are often used in circumstances that require the water in these gases to be removed. Water may be removed, for example, to prevent the formation of hydrates in downstream processes and pipelines, meet dew point specifications for the sale of the gas, and to prevent corrosion associated with wet gas.

There are two general categories of gas dehydration systems; solid desiccant and liquid desiccant. Liquid desiccant systems are relatively simple to operate and easy to maintain. Unfortunately, the liquid desiccant systems are typically unable to produce gases with extremely low levels of moisture. Solid desiccant systems are often used to provide gas with very low levels of moisture, however these plants can be more complex and expensive to operate than liquid desiccant systems. Thus, there is a continuing need for a relatively simple liquid desiccant gas dehydration system that produces gas with the low moisture content normally associated with solid desiccant systems.

Hygroscopic liquids such as triethylene glycol, diethylene glycol and tetraethylene glycol are commonly used liquid desiccants. In the typical liquid desiccant system, a substantially dry glycol such as one of the those listed above is introduced to the top of a contactor. The liquid desiccant flows downward through the contactor while at the same time, wet gas is introduced at the bottom of the contactor. When the liquid desiccant and gas contact each other, the liquid desiccant absorbs water from the gas. Water-rich liquid desiccant is removed from the bottom of the contactor, while dry gas leaves the top of the contactor. Water absorbed by the liquid desiccant is removed by the application of heat and the liquid desiccant is thus regenerated and reused. The dryness of the gas, expressed as its "dew point" depends on several factors, including the water content of the dry liquid desiccant, the number of theoretical stages in the contactor, and the liquid desiccant and gas flow rates. The dew point of the dry gas leaving the contactor decreases as the water content of the dry liquid desiccant entering the contactor decreases. To produce a dry gas with a very low dew point, it is essential that the dry liquid desiccant entering the contactor have an extremely low moisture content.

The regeneration of wet liquid desiccant is typically accomplished by heating it in order to vaporize the water it has absorbed from the wet gas. The concentration of water in a regenerated liquid desiccant depends in part on the regeneration temperature and pressure. Theoretically, it is possible to produce liquid desiccant with very low levels of water by subjecting the liquid desiccant to high temperatures. However, as the regeneration temperature approaches the boiling point of pure liquid desiccant, the liquid desiccant thermally decomposes. To avoid this problem, thermal regeneration of liquid desiccants is usually limited to temperatures below the thermal decomposition point of the liquid desiccant. This results in a relatively high concentration of water in the regenerated liquid desiccant. The higher concentration of water in the liquid desiccant produces dry gas with a higher than desirable dew point. To date, attempts to deal with the problem of producing low dew point gas with a liquid desiccant system have met with limited success.

In one process, described in U.S. Pat. No. 3,105,748, an aliquot of dried natural gas is heated to 325° F. to 365° F. in a gas-fired heater. The gas is passed through wet glycol maintained at the same temperature. This gas strips water from the glycol and produces a regenerated glycol with a lower concentration of water than can be obtained with heat alone at the indicated regeneration temperature. The stripping gas is then either vented or flared. This practice, however, has the undesirable effects of wasting gas and polluting the atmosphere. Moreover, the hot glycol may also contain toxic components such as benzene and toluene, absorbed from the gas that is dried in the process. When stripping gas is applied to the wet glycol, these toxic components are purged in a manner that does not permit their condensation at ambient conditions. While it is possible to compress the stripping gas in order to reuse the gas and facilitate the condensation of its toxic components, this is a high maintenance and high cost solution.

In another process, described in U.S. Pat. No. 3,349,544, an azeotroping agent is introduced below the surface of the liquid desiccant in a regeneration zone. The regeneration zone is maintained at a temperature above the vaporization temperature of the azeotroping agent. A vaporized mixture of water and azeotroping agent is condensed and the water is separated from the azeotrope. The azeotroping agent is then recycled. The azeotroping agent acts as a moisture carrier, allowing the regeneration zone to be operated at a lower partial pressure of water vapor. This produces drier liquid desiccant without subjecting the liquid desiccant to excessively high regeneration temperatures. While this azeotroping agent process produces a regenerated liquid desiccant with a lower moisture content than can be achieved in a conventional liquid desiccant process, the moisture content of the liquid desiccant cannot be reduced below the equilibrium concentration dictated by the partial pressure of water in the regeneration zone.

In an improvement over the process described in U.S. Pat. No. 3,349,544, presented in U.S. Pat. No. 4,005,997, the recovered azeotroping agent is vaporized, superheated to the regeneration temperature and fed to an isothermal stripper in counter current contact with semi-lean hot liquid desiccant produced from the liquid desiccant regenerator. The additional stripping action at the regeneration temperature improves the performance of the azeotroping agent, removing more water than the process described in U.S. Pat. No. 3,349,544. Again, the azeotroping agent is no more than a moisture carrier that further improves the regeneration with additional stripping action. The moisture content of the liquid desiccant cannot be reduced below the equilibrium water content dictated by the operating temperature and pressure.

SUMMARY OF THE INVENTION

This invention is directed to an improved liquid desiccant dehydration of gases wherein the regeneration of wet liquid desiccant to very low levels of moisture enables the process to produce dry gas with extremely low dew points. The invention accomplishes this by stripping partially dehydrated liquid desiccant with a dried stripping agent or "solvent."

One aspect of the invention is to produce a liquid desiccant with a very low moisture content. When this low moisture liquid desiccant is used to dry gas, the moisture content of the dried gas is 0.1 ppm or lower, a level suitable for cryogenic processing.

Another aspect of the invention concerns reducing the moisture content of the solvent used as a stripping agent during the regeneration of the liquid desiccant such that the regenerated liquid desiccant has a moisture content of 10 ppm and lower. This is accomplished by drying the solvent in a solid-liquid contactor containing commercially available solid desiccant such as silica gel, aluminum gel, alumina or molecular sieves.

Additional features of the present invention include the recovery of light hydrocarbons removed from the wet gas for use as solvent, and the separation and removal of noncondensable gases and lighter components from the liquid desiccant.

The liquid desiccant of the invention is a hygroscopic liquid. Representative liquid desiccants are well known in the art and include polyols alone or in a mixture. Typical polyols include liquid compounds such as ethylene glycol, propylene glycol, butylene glycol, pentylene glycol, glycerol, trimethyol propane, diethylene glycol, triethylene glycol, tetraethylene glycol, dipropylene glycol, tripopylene glycol, tetrapropylene glycol, and mixtures thereof. These glycols contain from 2 to 12 carbon atoms.

Polyol compounds which are normally solid, but which are substantially soluble in anhydrous liquid polyols or liquid hydroxyl amines, may also be used as liquid desiccants. Typical of these solid polyol compounds are erythritol, sorbitol, pentaerythritol and low molecular weight sugars. Typical hydroxyl amines include alkanolamines such as monoethanol amine, diethanol amine, triethanol amine, iso-propanol amine, including mono, di, and tri, isopropanol amine or diglycolamine. The alkanolamines can contain from 2 to 9 carbon atoms.

A stripping agent is employed to regenerate the liquid desiccant to a higher purity. The stripping agent also acts as a solvent that absorbs hydrocarbons that were removed from the wet gas in the contactor by the liquid desiccant. The solvent can be a liquid hydrocarbon, either aliphatic or aromatic, or mixtures thereof, which is substantially insoluble in the liquid desiccant and in water, and which has a boiling temperature between from about 40° C. and about 160° C. A non-hydrocarbon could also be used as a solvent. The non-hydrocarbon solvent would have a boiling range of about 80° C. to about 100° C. for 90% of the mixture with an end point not greater than about 130° C. The specific gravity of the non-hydrocarbon solvent would need to be between about 0.7 to about 0.9 to permit economical solvent-water separation. The solvent will also consist of hydrocarbons removed from the gas that is dried in the contactor. Preferably, the solubility of the solvent in the liquid desiccant should not exceed about 5 percent.

Liquid aliphatic hydrocarbons may include alkanes, cycloalkanes, alkenes, and cycloalkenes with normal boiling points in the range of about 40° C. to about 160° C. Representative aliphatic hydrocarbons include the straight and branched chain monoalkenes and alkanes having from 6 to 10 carbon atoms and mixtures thereof. Representative aromatic hydrocarbons include benzene, toluene, xylene, ethyl benzene, and the like. Representative mixtures of aliphatic and/or aromatic hydrocarbons include petroleum fractions in the desired boiling range such as naphtha and natural gasoline, which can include in the mixture hydrocarbons with number of carbon atoms as low as 3, and as high as 15.

In practicing the invention, substantially dry liquid desiccant is introduced to the top of a contacting zone and wet gas is introduced at the bottom of the contacting zone. The liquid desiccant flows down countercurrent to the gas flow and absorbs water from the gas. The dry gas leaving the contacting zone is suitable for use in applications demanding extremely low dew point gas. The wet liquid desiccant leaving the contacting zone is regenerated for reuse in the contacting zone. The wet liquid desiccant is initially heated and then flashed to remove substantially all dissolved hydrocarbons in the wet liquid desiccant.

The flashed wet liquid desiccant is introduced to a first stripping zone where it is heated and also stripped by vaporized solvent received from the overhead of a second stripping zone, described below. The heat can be provided by a conventional heat exchanger, a direct fired heater, a conventional stripper reboiler or any of the other systems well known to those with skill in the art. The overhead of the first stripping zone contains water, solvent, and light components. The bottoms of the first stripping zone contains partially dehydrated liquid desiccant.

The partially dehydrated liquid desiccant bottoms from the first stripping zone is introduced into a second stripping zone where its water is stripped by dried, vaporized solvent. The overhead of the second stripping zone, which contains vaporized solvent and water removed from the partially dehydrated liquid desiccant, is fed to the first stripping zone, where it acts as a stripping agent.

Solvent, water and other light products from the overhead of the first stripping zone are cooled and decanted in one or more separators. Solvent is recovered from the separator and dried to a very low moisture content in a conventional solid-liquid contacting zone that contains commercially available solid desiccant. The solid desiccant could be silica gel, aluminum gel, alumina or molecular sieves. Two desiccant beds are typically employed. One bed would be on-stream, absorbing water from the solvent, while the other bed is being regenerated and cooled. The solid desiccant is regenerated by passing a heated gas through it. The moist hot vapor stream exiting the regenerating bed can be cooled, condensing the water to facilitate its removal. The regeneration can be accomplished with any hot superheated gas. Readily available gas suitable for regeneration would include dry gas leaving the contactor or vaporized solvent.

Once dried, the solvent is vaporized and used as a stripping agent in the second stripping zone. The use of extremely dry solvent as the stripping agent in the second stripping zone produces a liquid desiccant leaving the second stripping zone with a very low moisture content. When this low moisture content liquid desiccant is used in the contacting zone, it produces dry gas with dew points significantly lower than what can be achieved in the conventional liquid desiccant dehydrators found in the prior art.

DESCRIPTION OF THE PREFERRED EMBODIMENT

Figure 1:
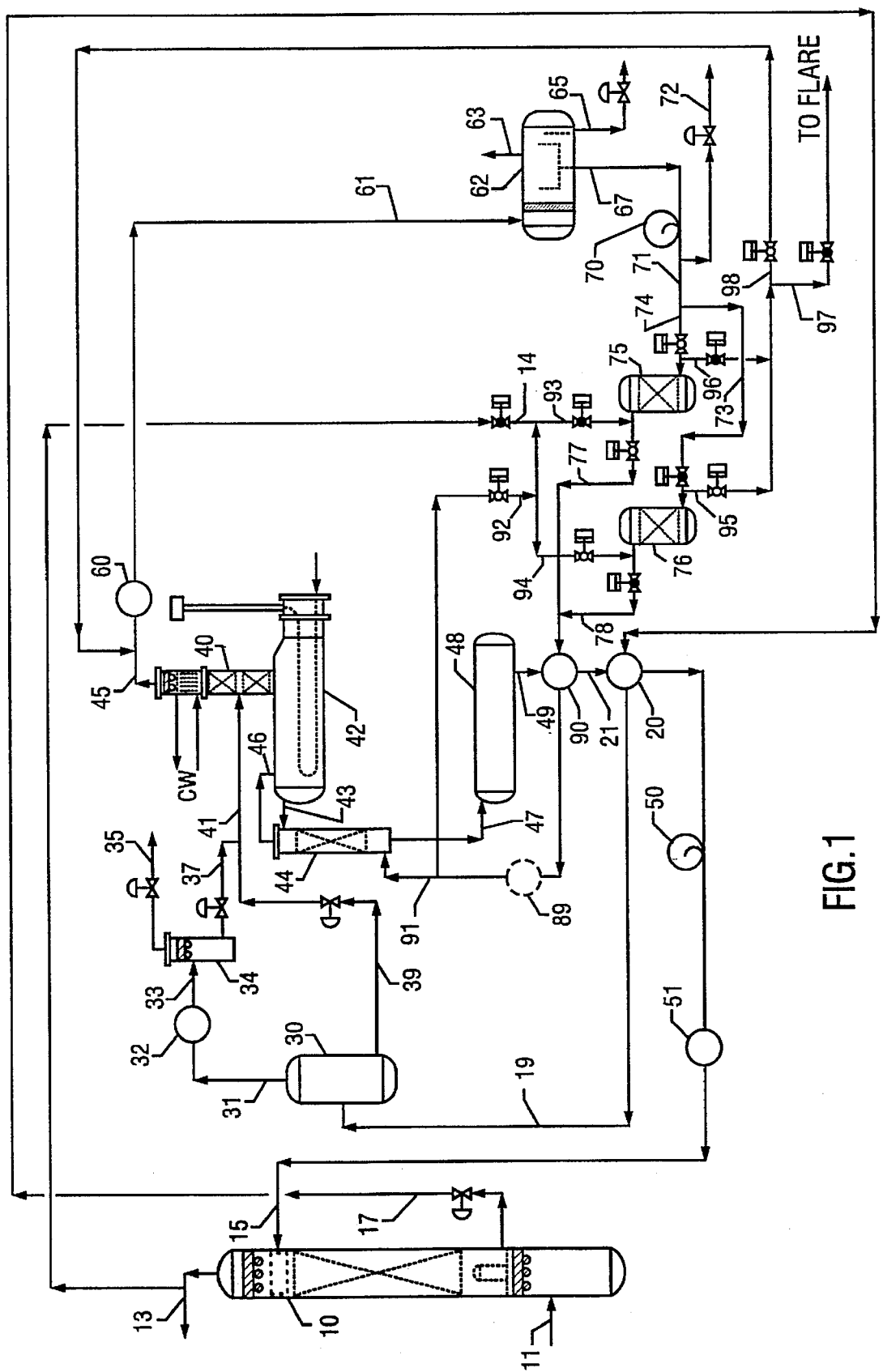
FIG. 1 is a schematic representation of a gas dehydration system according to the present invention.

FIG. 1 represents the preferred embodiment of the present invention. Contacting zone 10 is a conventional gas-liquid contacting column. An inlet 11 for the wet gas is located in the contacting zone below the contacting device, (typically trays or packing). Dried gas is removed from outlet 13. Dry liquid desiccant enters the contacting zone 10 from inlet line 15. Wet liquid desiccant is removed from contactor 10 via line 17.

Wet liquid desiccant flows via line 17 to heat exchanger 20 where it is heated to between about 100° C. and 180° C. by indirect heat exchange with substantially dry liquid desiccant delivered to heat exchanger 20 via line 21. The heated wet liquid desiccant flows via line 19 to flash drum 30 wherein substantially all dissolved hydrocarbons removed from the wet gas by the dry liquid desiccant are flash separated from the wet liquid desiccant.

Flashed gas leaves flash drum 30 and flows via line 31 to cooler 32 where hydrocarbons, water and any liquid desiccant present in the vapor stream are condensed. The cooled stream from cooler 32 flows through line 33 to flash gas separator 34 wherein any noncondensed light ends are separated and vented from the system via line 35. This gas may be flared, utilized as a fuel source or otherwise recovered.

Liquid from flash gas separator 34 which contains hydrocarbons, water and liquid desiccant, leaves flash gas separator 34 via line 37 and joins the flashed wet liquid desiccant flowing from line 39. The combined wet liquid desiccant stream flows through line 41 to first stripping zone 40 wherein the wet liquid desiccant is subjected to heating by reboiler 42 and the stripping by stripping agent received from the overhead of second stripping zone 44, via line 46.

The combined wet liquid desiccant stream from line 41 is heated to about 150° C. to about 205° C. in reboiler 42. The heating of the wet liquid desiccant and the action of the stripping agent remove from about 50% to about 95% of the water originally contained in the combined wet liquid desiccant stream. Vapor from first stripping zone 40 which is at a temperature of about 85° C. to about 100° C., is conveyed via line 45 to condenser 60, where it is partially condensed and cooled to a temperature of about 0° C. to about 40° C. From condenser 60 the cooled stream flows via line 61 to three-phase separator 62. The small amount of vapor that does not condense in condenser 60 may be routed from separator 62 via line 63 to a flare or other system that can accommodate this gas. Condensed water from separator 62 is discharged via line 65 to a conventional water treatment facility. Solvent accumulated in separator 62 exits via line 67 and is routed to pump 70. The solvent is discharged from pump 70 via line 71 and is directed via line 74 to solid desiccant drying bed 75 of the solid desiccant dryer and if necessary, via line 72 as described below. The solid desiccant dryer is comprised of solid desiccant drying bed 75 and solid desiccant bed 76. Solid desiccant drying bed 75 is depicted in drying mode and solid desiccant bed 76 is depicted in regeneration mode. When solid desiccant drying bed 75 is in drying mode, the solvent discharged from pump 70 via line 71 is directed to line 73 to solid desiccant drying bed 76.

In solid desiccant dryer 75 the solvent is dried from an equilibrium water content of about 100 ppm to about 2000 ppm (depending on solvent composition and relevant water retention in hydrocarbon phase) down to about 10 ppm to almost zero ppm. The dried solvent exits solid desiccant drying bed 75 via line 77 and is then heated and vaporized in liquid desiccant cross exchanger 90. When solid desiccant drying bed 76 is in regeneration mode, the dried solvent exits solid desiccant drying bed 76 via line 78 and is then heated and vaporized in liquid desiccant cross exchanger 90. The vaporized solvent may be further superheated in optional superheater 89 before entering the second stripping zone 44 via line 91.

A portion of superheated solvent vapor is diverted from line 91 to line 92 and is used to dry the desiccant in solid desiccant drying bed 76, which is in regeneration mode. Moist superheated solvent vapor leaves solid desiccant dryer bed 76 via line 95 and is conveyed to line 45 via line 98.

Once the moisture in solid desiccant bed 76 is removed by the superheated solvent, the flow of superheated solvent to solid desiccant dryer bed 76 is terminated and solid desiccant drying bed 76 is placed in cooling mode. A portion of dried gas is diverted from line 13 and conveyed via line 14 and then line 94 to solid desiccant dryer bed 76. Dry gas flows through solid desiccant dryer bed 76, cooling the desiccant and then leaves solid desiccant dryer bed 76 via line 95 and is transported via line 97 to a gas flare for disposal. Once the cooling mode is completed for solid desiccant drying bed 76, it can then be placed in drying mode. When solid desiccant drying bed 75 is in regeneration mode and solid desiccant drying bed 76 is in drying mode, a portion of dried gas is diverted from line 13 and conveyed via line 14 and then to line 93 to solid desiccant drying bed 75. Dry gas in this configuration flows through solid desiccant drying bed 76 and upon exiting the bed, flows through line 96 and is transported via line 97 to a gas flare for disposal. Solid desiccant dryer beds 75 and 76 alternate between drying, cooling mode and regeneration mode automatically, every eight hours, or a longer cycle, as solvent drying conditions require.

Hot, partially regenerated liquid desiccant flows from reboiler 42 via line 43 to second stripping zone 44, a conventional stripping column. In second stripping zone 44, substantially all the remaining water in the liquid desiccant is removed by the stripping action of the stripping agent, dry vaporized solvent.. The stripped water and stripping agent leave second stripping zone 44 via line 46 and are delivered to reboiler 42. Liquid desiccant that is substantially dry leaves second stripping zone 44 from outlet line 47 and flows to surge vessel 48. Dry liquid desiccant leaves surge vessel 48 via line 49 and supplies heat for vaporizing the solvent in liquid desiccant cross exchanger 90. The partially cooled dry liquid desiccant leaving cross heater 90 is transported via line 21 to heat exchanger 20. In heat exchanger 20, the partially cooled dry liquid desiccant is further cooled by indirect heat exchange with wet liquid desiccant. The partially cooled dry liquid desiccant is then pumped by liquid desiccant pump 50 to heat exchanger, 51 for further cooling before entering contacting zone 10 via line 15 as described above.

Solvent will be produced if the wet gas stream has adequate amounts of suitable components, such as light hydrocarbons, that are absorbed by the liquid desiccant in contactor 10. This compensates for various solvent circulation losses. If excess solvent is thus produced, it is diverted from the discharge of pump 70 through discharge line 72 to storage or other uses. If the solvent obtained from the wet gas is insufficient to compensate for various solvent circulation losses, fresh solvent is added to the system.

EXAMPLE 1

A wet liquid desiccant solution of aqueous triethylene glycol (TEG) containing approximately 3.5% water was fed at the rate of 5.2 m³/hr to a regeneration system as depicted by the apparatus in FIG. 1 including a reboiler 42 placed between a first stripper 40 and a second stripper 44. The first stripper and the second stripper contained respectively 1.8 m meters and 3.0 m meters of 1-inch pall ring packing. The reboiler was operated at 204° C., resulting in a continuous stream of semi-regenerated TEG being fed to the top of the second stripper at 204° C. and contacted with solvent vapors. The solvent vapors were superheated to 227° C. to supply the heat for vaporizing water from the TEG. The solvent flow rate, measured as a liquid after it is pumped by the solvent pump, was maintained at approximately 1.8 m³/hr. The overhead vapor from the first stripper was cooled in a water cooled exchanger to 38° C. wherein substantially all water vapor and solvent were condensed. The condensed solvent was separated from the water, dried in the solid bed dryer, and reused. At steady state conditions, the recycled solvent contained less than 1 ppm of water by weight, and the dry liquid desiccant contained less than 10 ppm of water by weight. The regenerated liquid desiccant contained 99.999 wt % TEG. This purity of TEG is capable of reducing the moisture content of the gas exiting the absorber to about 0.1 ppm. The water content of the wet inlet gas varied from 100 to 21 ppm at a contactor pressure of 90 Bar and a contactor temperature of 4° C.

EXAMPLE 2

Example 2 was performed under the same operating conditions as Example 1, with the exception that the condensates from the first stripper overhead were subcooled to 10° C. using a refrigerant at 5° C. At steady state conditions, the solvent in the first stripper overhead contained 92 ppm water by weight. The solvent dryer eliminated virtually all the remaining water in the solvent. The dry liquid desiccant produced by stripping with this solvent contained 12 ppm water by weight and 99.999+ wt % TEG. This dry liquid desiccant can be used to dry a wet industrial gas to a dew point of −80° C. or lower.

EXAMPLE 3

Under the same operating conditions of Example 1, natural gasoline was used as the solvent. The solvent flow rate was maintained at 0.3 liter per liter of wet liquid desiccant. At the steady state conditions, the dry liquid desiccant contained 26 ppm of water by weight. The natural gasoline used as solvent was a debutanized natural gas condensate, consisting of hydrocarbons in the range of $C_5$ to $C_{12}$. The resultant dried liquid desiccant produced by stripping with dried natural gasoline solvent, was 99.998+ wt % TEG.

EXAMPLE 4

A wet liquid desiccant solution of aqueous diethylene glycol (DEG) containing 5%. water was fed at the rate of 2 liters per hour to an apparatus similar to that described in Example 1. The reboiler was operated at 175° C. and the circulation rate of solvent at 200° C. was maintained at 0.3 liter per liter of wet liquid desiccant. The resulting partially regenerated liquid desiccant leaving the first stripper contained 200 ppm of water by weight. After the partially regenerated liquid desiccant was stripped with dried vaporized solvent, the dry liquid desiccant contained less than 40 ppm of water by weight. The resultant dry liquid desiccant contained 99.99+ wt % DEG.

EXAMPLE 5

A dry liquid desiccant comprised of TEG obtained from the process described in Example 1 was fed to a glycol contactor 10 as depicted in FIG. 1 at the rate of 5.2 m³/hr. A wet natural gas saturated with water at 4° C. to 20° C. and 1350 psig to 1800 psig was fed to the bottom of the contactor at the rate of 7.08×10⁶ SCMD. The contactor was packed with 20 feet of structured packing. The contactor diameter was 2133 mm.

The dry gas removed from the top of the contactor contained less than 0.1 ppm by weight of water with an equivalent dew point of −85° C. at the operating pressure. The wet liquid desiccant removed from the bottom of the contactor was heated to 150° C. before feeding the flash tank. The flash drum pressure was controlled to 50 psig. The flash gas from the flash drum was cooled to 25° C. in an air cooled exchanger. A sample of the condensate from the exchanger was collected in a solvent-water separator over a period of 24 hours. Analysis indicated that the resultant condensate thus recovered contained hydrocarbons in the $C_3$ to $C_{13}$ range, suitable for use as the solvent in the liquid desiccant regeneration.

What is claimed is:

1. A method of drying a wet gas with a liquid desiccant which comprises:

contacting said wet gas with a substantially dry liquid desiccant in a contacting zone to remove water from said wet gas and form a wet liquid desiccant and a dry gas product;

heating and flashing said wet liquid desiccant to form a flash gas and a flashed wet liquid desiccant;

passing said flashed wet liquid desiccant sequentially through a first stripping zone and a second stripping zone;

passing a vaporized dry stripping agent sequentially through said second stripping zone and said first stripping zone in counter-current relation with said flashed wet liquid desiccant to strip water from said flashed liquid desiccant and form an overhead stream from said first stripping zone and said substantially dry liquid desiccant from said second stripping zone;

maintaining said first and second stripping zones at temperatures sufficient to remove water but not decompose said flashed wet liquid desiccant;

cooling said overhead stream sufficiently to condense water and stripping agent;

separating resulting condensed stripping agent from resulting condensed water;

contacting said separated condensed stripping agent with a solid desiccant to dry said separated condensed stripping agent and form said dry stripping agent;

heating said dry stripping agent sufficiently to form a vaporized dry stripping agent;

recycling said vaporized dry stripping agent to said second stripping zone; and recycling said substantially dry liquid desiccant from said second stripping zone to contact said wet gas in said contacting zone.

2. The method of claim 1, in which the liquid desiccant is a glycol from the group consisting of triethylene glycol, diethylene glycol and monoethylene glycol.

3. The method of claim 1, in which the wet gas comprises a gas from the group consisting of natural gas, oil production facility gas, refinery gas, carbon dioxide, synthesis gas and hydrogen.

4. The method of claim 1, wherein the liquid desiccant is a glycol of 2 to 12 carbon atoms.

5. The method of claim 1, wherein the stripping agent is naphtha.

6. The method of claim 1, wherein the stripping agent is natural gasoline.

7. The method of claim 1 wherein the stripping agent comprises aliphatic hydrocarbons having a boiling range between about 40° C. and about 160° C.

8. The method of claim 1 wherein the stripping agent comprises aromatic hydrocarbons boiling in range between about 40° C. and about 160° C.

* * * * *